United States Patent [19]

Liscinsky

[11] Patent Number: 5,310,100
[45] Date of Patent: May 10, 1994

[54] CARRIER FOR MOUNTING ON VEHICLE HITCH

[76] Inventor: Mark E. Liscinsky, 2175 Garry, Troy, Mich. 48084

[21] Appl. No.: 2,330

[22] Filed: Jan. 8, 1993

[51] Int. Cl.⁵ ............................................. B60R 9/00
[52] U.S. Cl. ..................... 224/42.01; 224/42.03 A; 224/42.44; 224/42.45 R; 108/44
[58] Field of Search ............... 224/42.03 A, 42.03 R, 224/42.07, 42.08, 42.43, 42.44, 42.45 R, 42.01; 108/44, 137

[56] References Cited

U.S. PATENT DOCUMENTS

| | | | |
|---|---|---|---|
| 3,039,634 | 6/1962 | Hobson et al. | 224/42.03 R |
| 3,251,520 | 5/1966 | Van Dyke et al. | 224/42.44 |
| 3,999,693 | 12/1976 | Cooper, Sr. | 224/42.03 A |
| 4,320,862 | 3/1982 | Bettenhausen | 224/42.03 A |
| 4,593,840 | 6/1986 | Chown . | |
| 4,671,439 | 6/1987 | Growneweg . | |
| 4,676,414 | 6/1987 | Deguevara | 224/42.03 R |
| 4,813,584 | 3/1989 | Wiley | 224/42.44 |
| 4,844,528 | 7/1989 | Johnson . | |
| 4,915,276 | 4/1990 | Devito . | |
| 5,033,662 | 7/1991 | Godlin . | |
| 5,038,983 | 8/1991 | Tomososki | 224/42.43 |
| 5,096,102 | 3/1992 | Tolson | 224/42.07 |
| 5,106,002 | 4/1992 | Smith et al. . | |

*Primary Examiner*—Linda J. Sholl
*Attorney, Agent, or Firm*—Dykema Gossett

[57] ABSTRACT

A carrier preferably for use on a vehicle such as a van includes a deck surface which is supported on the rear bumper of the van. The carrier may be moved between positions adjacent the van and a position spaced rearwardly of the van. In the spaced position, the rear doors of the van may be opened. Moreover, the carrier may be utilized as a table by a person sitting on the rear bumper of the van.

12 Claims, 2 Drawing Sheets

CARRIER FOR MOUNTING ON VEHICLE HITCH

BACKGROUND OF THE INVENTION

The present invention relates to a carrier which is preferably for use on motor vehicle vans.

Modern vans are often configured to be more passenger vans than storage vans. In such vehicles, it would be desirable to provide additional storage space. Further, it would be desirable to provide a storage member which may be readily adapted to current vans.

Several types of storage members are known to be attached to the rear portion of a vehicle. In general, these are overly large storage members which would be impractical and expensive to manufacture.

It is an object of the present invention to disclose a storage member which is readily adaptable to existing van structures, and also is practical to use.

SUMMARY OF THE INVENTION

In a disclosed embodiment, a storage member is selectively moved between a position adjacent a vehicle, and a position spaced from the vehicle. In the spaced position, the storage member allows access to the rear of the vehicle. Moreover, the carrier is preferably attached to the hitch on a van, and has a deck surface supported on a rear bumper of the van. When the carrier is moved to the spaced position, the carrier provides a table-like surface for users sitting on the rear bumper of the van.

In other features of the present invention, there is a means to adjust the position of the carrier relative to the hitch on the van. In one disclosed embodiment the means to adjust includes a first member which is inserted into the hitch, and which has a plurality of apertures such that the first member can be attached to the hitch at any selected position. In this way, one can position the carrier close to, or spaced from, the van.

In other features of this invention, the carrier has a deck which is supported on the bumper, and which has a threaded adjustment member to ensure that the deck is supported on the bumper. Also, the carrier has a generally flat surface such that it can be used as a table.

These and other features of the present invention can be best understood from the following specification and drawings, of which the following is a brief description.

DETAILED DESCRIPTION OF A PREFERRED EMBODIMENT

Figure 1:
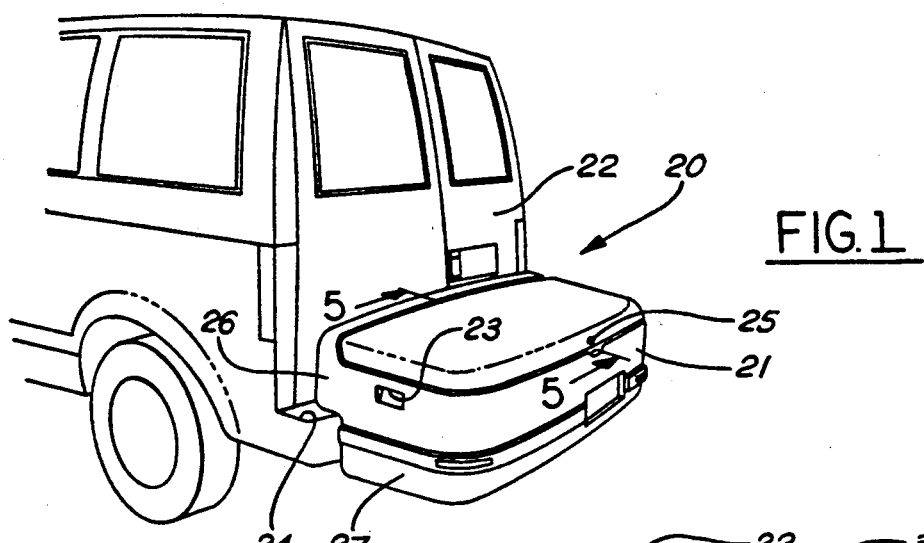
FIG. 1 is a perspective view showing the inventive carrier mounted to a vehicle.

FIG. 1 shows a carrier 20 having a compartment body 21 which is attached to the rear of a van 22. As shown, a rear bumper 24 supports a deck portion 26 of the carrier 20. A rearward storage portion 27 extends for a greater axial distance than deck portion 26, and generally extends between the vertical uppermost portion of deck portion 26 to a vertically lower portion of the bumper 24.

Figure 2:
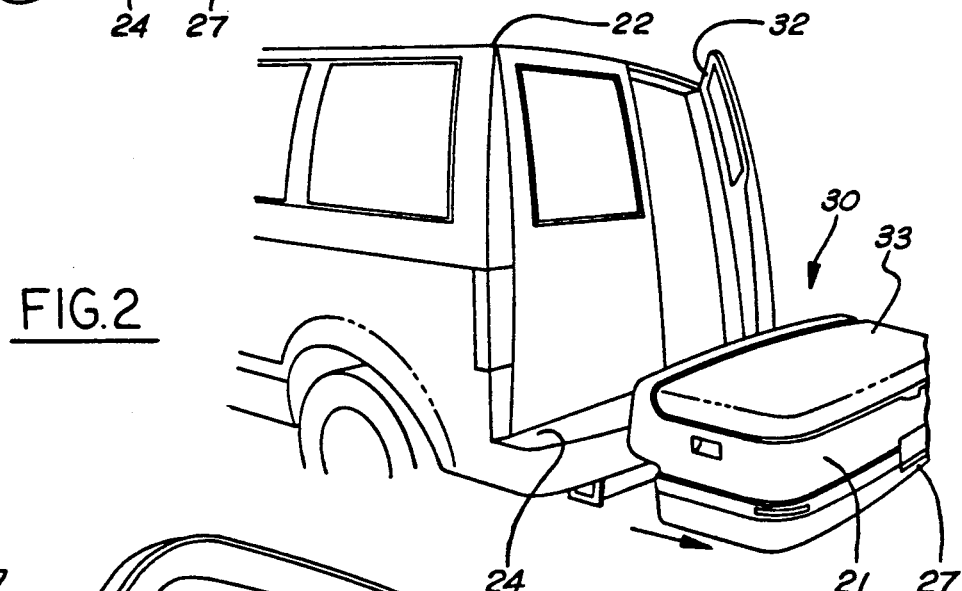
FIG. 2 is a view similar to FIG. 1 but showing the carrier spaced from the vehicle.

As shown in FIG. 2, carrier 21 has been moved to a rearwardly spaced position 30. In spaced position 30, a rear door 32 of van 22 can be opened to provide access to the rear of van 22. Moreover, when carrier 20 is positioned in the spaced position 30, the top 33 of carrier 21 can be utilized as a table by persons sitting on bumper 24. To facilitate this, top 33 is generally flat.

Figure 3:
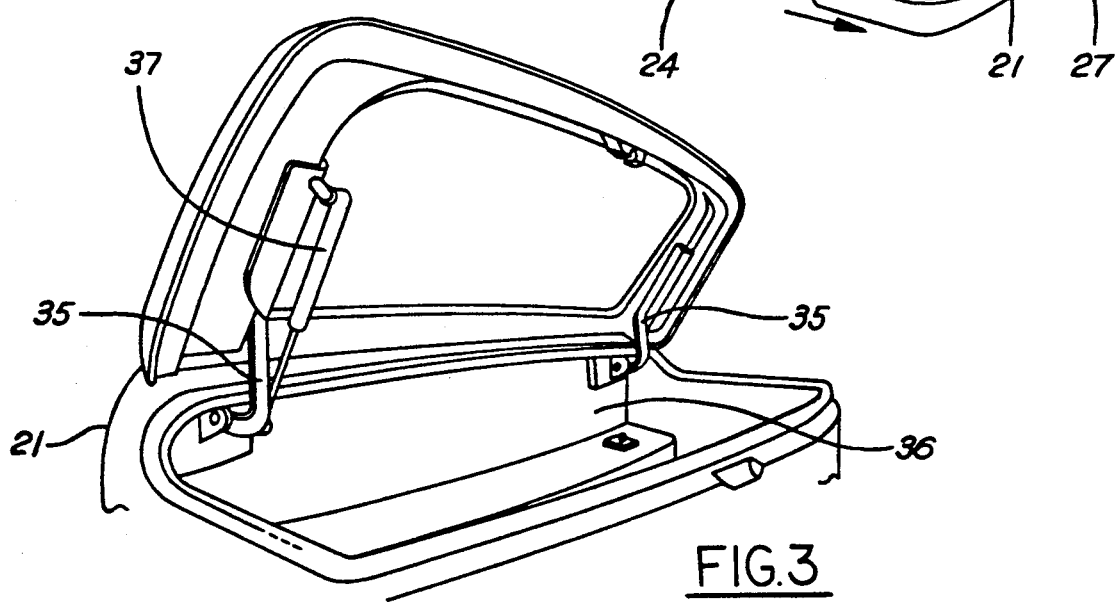
FIG. 3 is a perspective view of the carrier, with the door or top panel in a raised position to show the interior of the carrier.

As shown in FIG. 3, a top panel, lid or access door 34 in carrier 20 opens through use of pivotal hinges and a gas strut 37 to provide access to compartment 36 in body 21. The body 21 is provided with recesses 23 which form handle receiving openings for manually transporting the carrier 20 to and from the van 22. A carrier lock 25 is provided to retain the door 34 in a closed position. A license plate bracket 28 is also provided.

Figure 4:
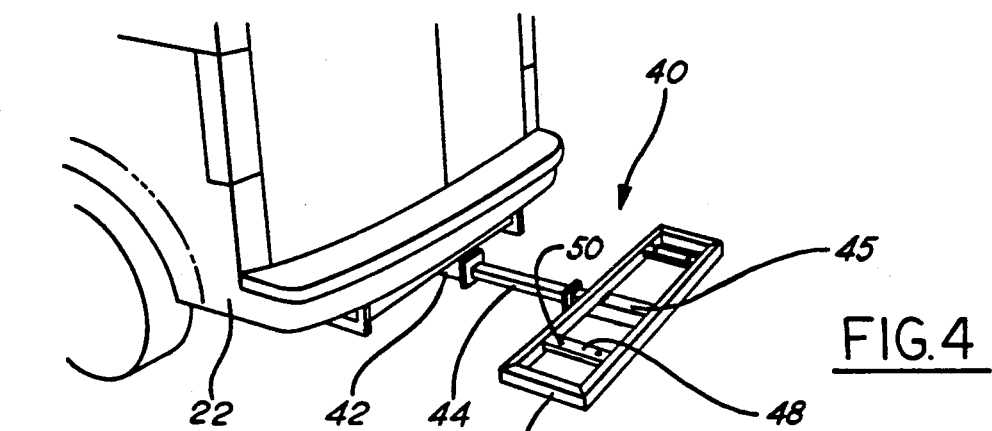
FIG. 4 is a perspective view showing a support member for the carrier.

As shown in FIG. 4, a support structure 40 is attached to hitch 42 to support body 21 relative to van 22. As shown, first member 44 selectively slides into and out of hitch 42 to control the location of body 21 relative to van 22. A frame 46 actually supports body 21 and includes cross members 48 having bolt holes 50. A strut 45 is received on first member 44 to secure frame 46 to first member 44.

Figure 5:
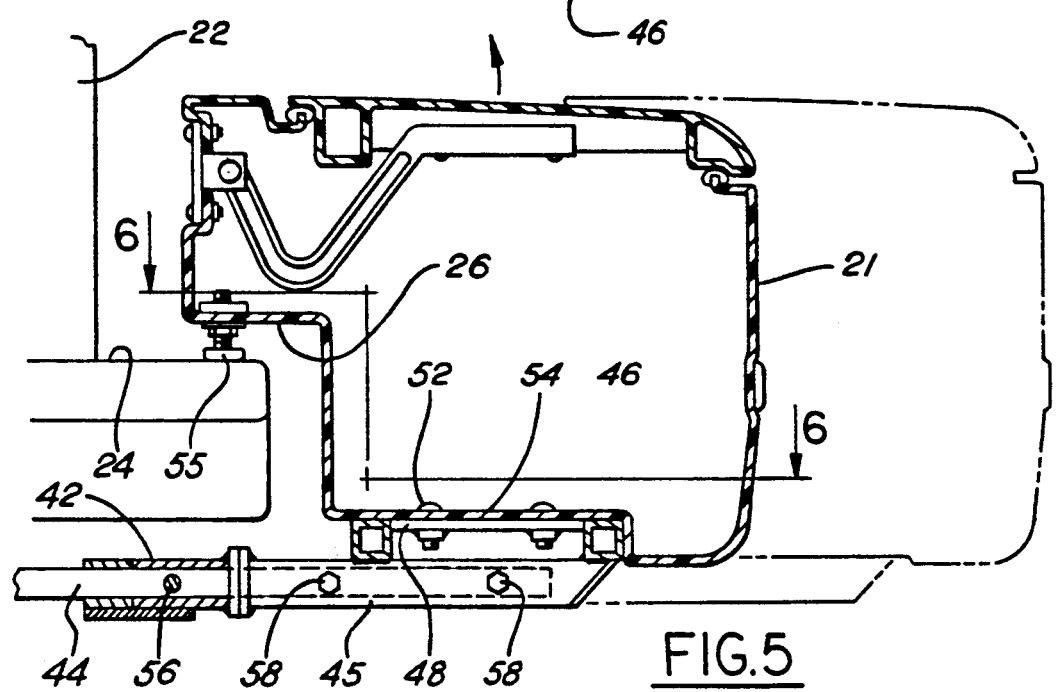
FIG. 5 is a cross-sectional view through the carrier taken along the line 5—5 of FIG. 1.

As shown in FIG. 5, body 21 is connected to bolt holes 50 by bolts 52 passing through a bottom 54 of body 21. In this way, body 21 is fixed to frame 46 which is fixed to strut 45. Strut 45 is connected by bolts 58 to first member 44. As shown, first member 44 is connected by a pin 56 to hitch 42. When one wishes to adjust the location of body 21 relative to vehicle 22, one moves first member 44 axially inwardly or outwardly relative to hitch 42, and inserts pin 56 through selected apertures in member 44.

As also shown, one or more threaded members 55 may be adjusted vertically to support deck portion 26 of the carrier 20 on the rear bumper 24. The threaded members are used for leveling purposes.

Figure 6:
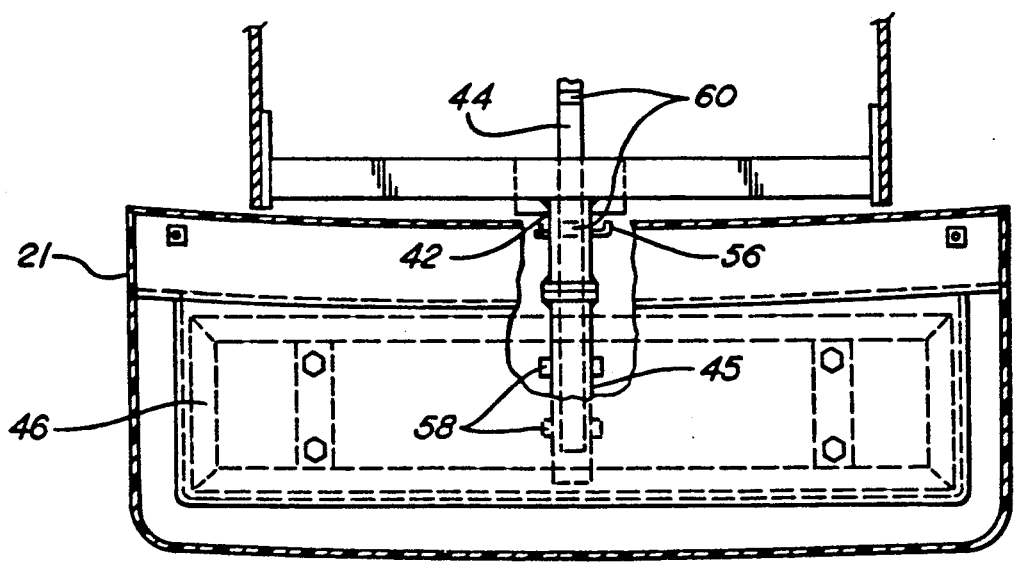
FIG. 6 is a cross-sectional view generally taken along the line 6—6 of FIG. 5.

As shown in FIG. 6, bolts 58 secure strut 45 to first member 44. As also shown, first member 44 includes a plurality of apertures 60, such that pin 56 can be inserted through selected ones of apertures 60 and through hitch 42 to secure the frame 46 at a desired location relative to hitch 44.

In a preferred embodiment of the present invention, the body 21 can be formed, as an example, of ABS plastic, or fiberglass or other suitable plastics. It may be injection molded, blow molded, or vacuum formed.

The carrier provides extra cargo space for goods for various vehicles including mini vans, full size vans, motor homes, travel trailers, etc.

A preferred embodiment of the present has been disclosed, however, a worker of ordinary skill in the art would recognize that certain modifications would come within the scope of this invention. For that reason, the following claims should be studied in order to determine the true scope and content of this invention.

I claim:

1. A carrier for use on a vehicle having a bumper disposed rearwardly thereof, the combination comprising:
    a hitch attached to the vehicle;
    a support structure attached to the hitch for supporting the carrier rearwardly of the vehicle;

a storage compartment having a selectively openable access door, vertical adjustment means for supporting at least part of said storage compartment over said bumper, said vertical adjustment means being adjustable to bear down on said bumper and support said at least part of said storage compartment at a predetermined distance above said bumper, and securing means to secure said carrier to said support structure, said securing means adapted to be spaced from said vehicle;

horizontal positioning means for selectively positioning said support structure between a first position at a first predetermined location adjacent rearwardly of the vehicle and a second position at a second predetermined location more rearwardly of the vehicle; and horizontal adjustment means for adjusting the spacing of said support structure from said vehicle to change the respective predetermined locations of said first position and said second position.

2. A carrier as recited in claim 1, wherein said storage compartment includes a large rear portion for storage of items and a generally smaller deck portion adapted to be spaced towards said vehicle relative to said large rear portion, said deck portion being adapted to be supported on said rear bumper.

3. A carrier as recited in claim 2, wherein said vertical adjustment means are threadably adjustable members which are adjustable to contact and support said carrier on said bumper of a vehicle.

4. A carrier as recited in claim 2, wherein when said support structure is in said second position said storage compartment is sufficiently removed from the vehicle such that the rear doors of the vehicle can be opened without the carrier obstructing the rear doors.

5. A carrier as recited in claim 1, wherein a top of said carrier is generally parallel to the ground such that said top can be utilized as a table.

6. A carrier as recited in claim 5, wherein said carrier has a top that is generally flat, said top of said carrier being above a vertically uppermost surface of the rear bumper of said vehicle such that when said carrier is positioned in said second position, said carrier is adapted to be used as a table by a person sitting on the rear bumper.

7. A carrier as recited in claim 1, wherein said horizontal adjustment means includes attachment means to attach said support structure to said hitch, said attachment means including said first member being inserted into said hitch, said first member having a plurality of apertures such that said first member can be secured at any one of several locations within said hitch, and said first member being connected to said storage compartment such that by securing said first member to the hitch at selected positions the distance between said compartment and the vehicle may be adjusted.

8. A carrier as recited in claim 7, wherein a pin is inserted through aligned holes in the hitch on the vehicle and said apertures in said first member to secure said first member to the hitch at a desired location.

9. A carrier as recited in claim 8, wherein said first member is fixed to a generally rectangular frame member which supports said compartment, and wherein said compartment is bolted to said frame member.

10. A carrier as recited in claim 1, wherein said access door is selectively pivotable to provide access to said compartment.

11. A carrier as recited in claim 1, wherein said support structure includes a first member extending along a longitudinal first member axis and an aperture extending transversely to said axis, through said first member, wherein said hitch extends along a longitudinal hitch axis and includes a pin and an aperture extending transversely through said hitch, and wherein said horizontal positioning means includes said hitch coaxially receiving said first member for sliding engagement thereinto, said pin being receivable through both said apertures to lock said hitch and said support structure into an engagement defining said carrier being in said first position, and when said pin is not received through said apertures, said carrier is adapted to be positioned toward said second position from said first position as said member is slid outwardly in said hitch and said carrier is adapted to be positioned toward said first position from said second position as said first member is slid inwardly in said hitch.

12. A carrier as recited in claim 11, wherein said support member includes a strut extending along a longitudinal strut axis and bolts received by said strut transverse thereto, said strut and wherein said horizontal adjustment means includes said strut coaxially receiving said first member for sliding engagement thereinto, said bolts being tightenable to lock said strut and said first member in an adjustable coaxial relationship to set the distance between said bumper and said first position.

* * * * *